UNITED STATES PATENT OFFICE.

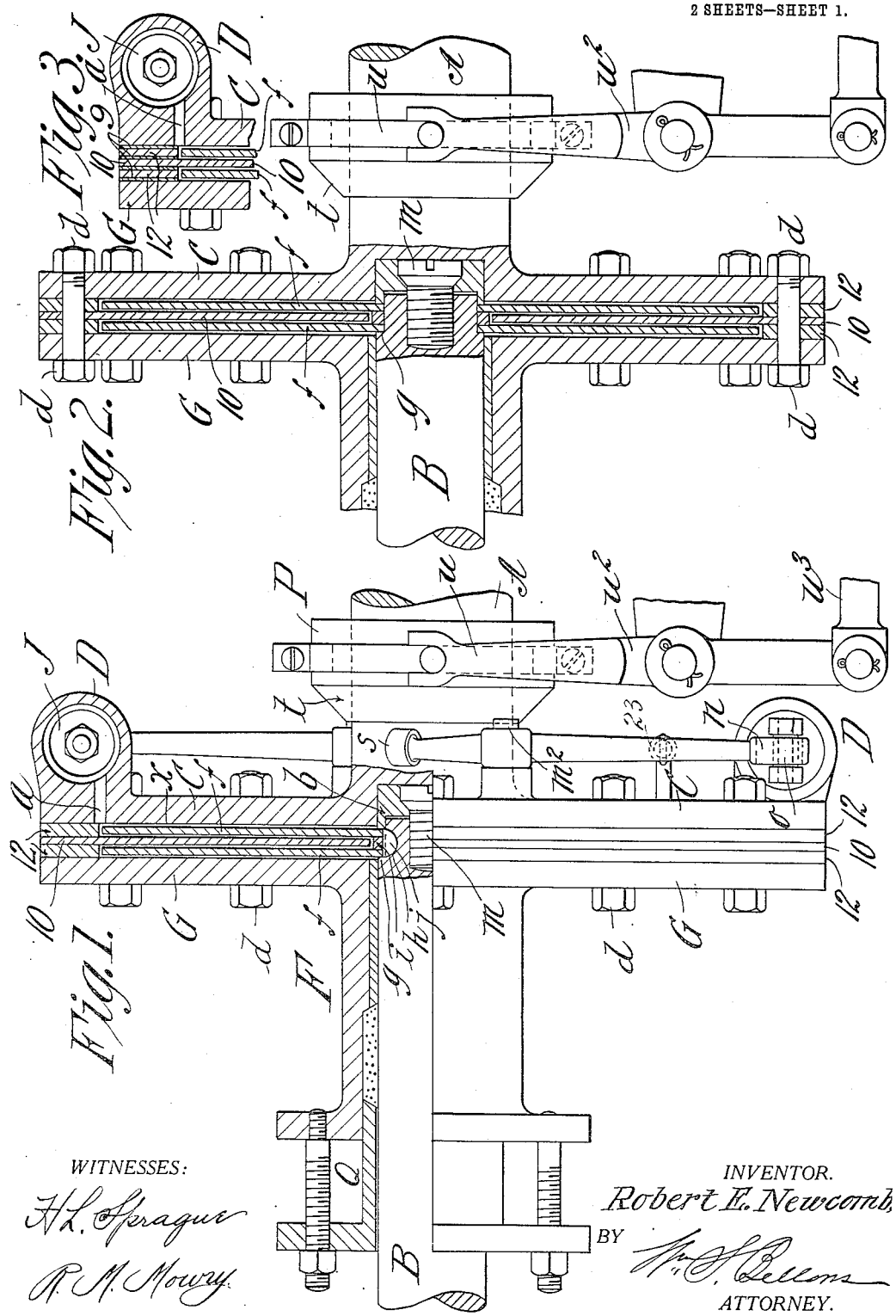

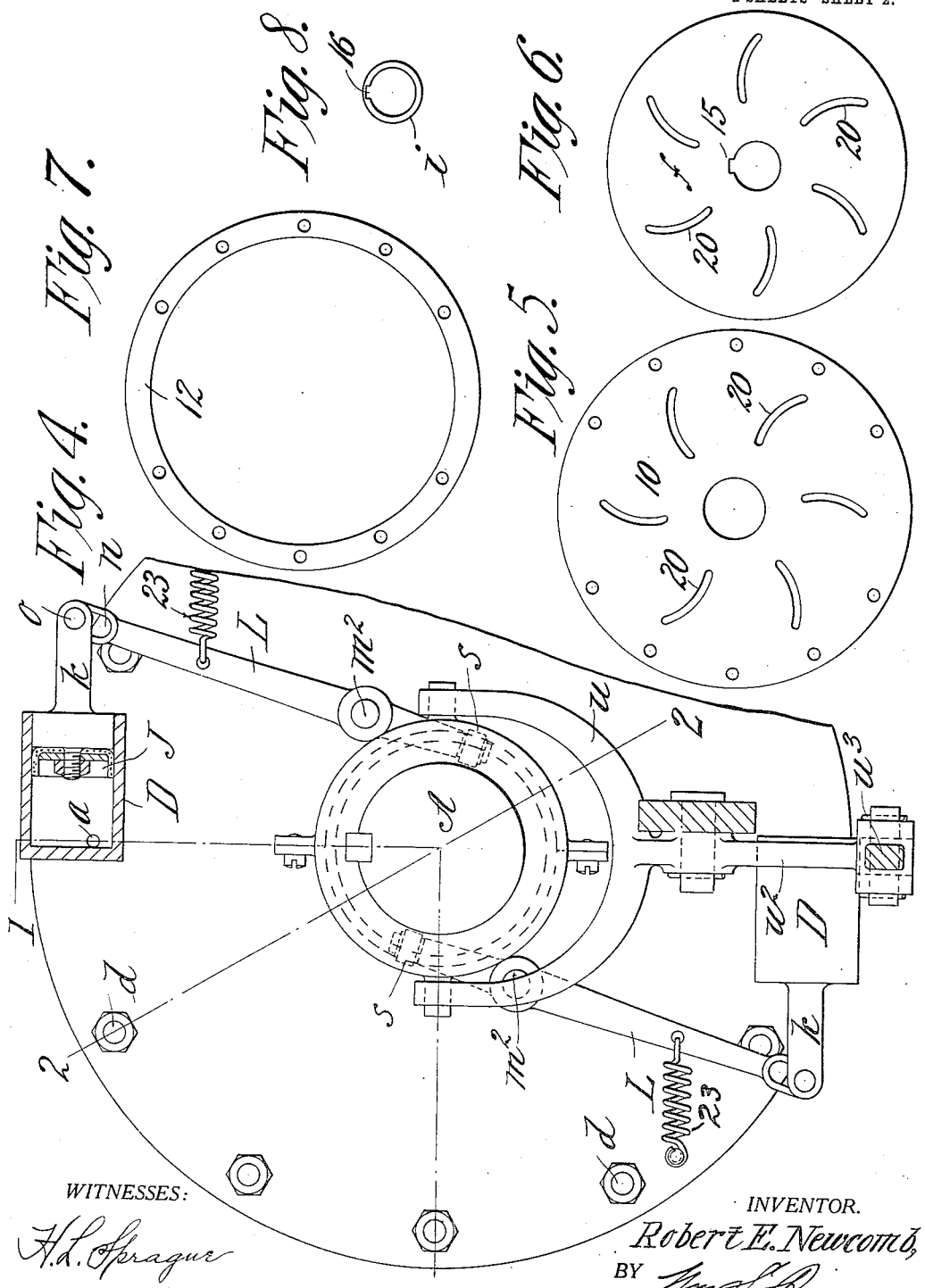

ROBERT E. NEWCOMB, OF HOLYOKE, MASSACHUSETTS.

FLUID-CLUTCH SPEED-CONTROLLER AND POWER-TRANSMITTER.

No. 923,565.   Specification of Letters Patent.   Patented June 1, 1909.

Application filed March 7, 1908. Serial No. 419,762.

*To all whom it may concern:*

Be it known that I, ROBERT E. NEWCOMB, a citizen of the United States of America, and resident of Holyoke, in the county of Hampden and State of Massachusetts, have invented certain new and useful Improvements in Fluid-Clutch Speed-Controllers and Power-Transmitters, of which the following is a full, clear, and exact description.

This invention relates to an improved power transmitting and speed controlling mechanism comprising a fluid pressure clutch available for transmitting power from a given rotating shaft or element to another rotating shaft or mechanism; and the same is available in its combination between one rotating element or mechanism and another where a change of speed between them is desired.

The invention comprises a shaft or rotating element having a hollow head and a secondary shaft axially alined with the first shaft having a portion thereof located concentrically within the chamber in said head and having a plate or disk affixed thereto and extended outwardly within said opening and means for applying fluid, under pressure, within the chambered head.

As specifically carried out the invention includes interleaved disks or plates, some thereof carried by circumferential portions of the chambered head and others carried by the secondary shaft and arranged in facewise relations and slightly separated one from the other.

The invention furthermore consists in the combination and arrangement of parts substantially as hereinafter described and set forth in the claims, reference being had to the accompanying drawings, in which,—

Figure 1 is in part a section on the plane of its axis of the fluid pressure clutch, and in part a side view. Fig. 2 is a sectional view on a plane intersecting the axis of the device different from that on which the sectional portion, Fig. 1 is taken. Fig. 3 is a partial sectional view showing elemental parts hereinafter referred to. Fig. 4 is a view as taken at the left hand end, Fig. 1. Line 1—1, on Fig. 4, indicates the plane on which the sectional portion of Fig. 1 is taken; and line 2—2, indicates the plane on which Fig. 2 is taken. Fig. 5 is a face view of one of the disks carried within, and by, the chambered head. Fig. 6 is a face view of one of the disks carried by the secondary shaft. Fig. 7 is a face view of one of the annular spacing sections combined in the chambered head. Fig. 8 is a face view of the spacing collar interposed between inner portions of the secondary shaft-carrying disks.

Similar characters of reference indicate corresponding parts in all of the views.

In the drawings,—A represents what is here regarded as the primary or driving shaft, and B the secondary or driven shaft. The primary shaft has a circular head flange C carrying one or more cylinders D, each having a port or way $a$ leading through said head flange near, but at a suitable distance within the outer edge thereof. The end portion of the secondary shaft is fitted within a bearing socket $b$ therefor in the flange head carrying portion of the primary shaft. The portion of the secondary shaft adjacent its end which has a bearing engagement in the primary shaft is inclosed within a sleeve section F, which is constructed with a circular flange G in opposition to the primary shaft head flange C.

10 represents a centrally apertured disk which together with annular spacing sections of any suitable material is confined or clamped, as by the bolts $d$, between marginal portions of the said shaft head flange C and the sleeve flange G.

$f f$ represent a pair of disks in separated relations, non-rotatively engaged on the end portion of the said secondary shaft, having their occupancy within the fluid chamber $x$ formed between the suitably separated head flanges C and G and outwardly closed by the spacing rings 12, 12, which clamp between them the marginal portion of the disk 10.

The extremity of the shaft B which is fitted in the aforementioned journal sockets $b$, axially beyond its end is made with a shoulder $g$ and a key way $h$. The centrally apertured disks, $f$ as shown in Fig. 6 also have key ways 15, so that in their engagements on the shaft B with an interposed spacing collar $i$ also having a key way 16, these parts by key or spline $j$ are engaged non-rotatively with the secondary shaft B; and the spacing collar keeps the disks $ff$ in their proper separation with relation to each other and also to the relatively intermediate disk 10 carried by the chambered head which is constituted mainly by the flanges C and G.

The disks $f f$ and spacing collar $i$ are clamped or confined against the shoulder by the open end portion of a thimble, which may be regarded as a separable or sectionally formed end portion of the secondary shaft and which incloses such end portion and has, directly a bearing in the aforementioned socket $b$, being considered, when the parts of the device are assembled, a unitary part of the shaft B. This thimble is held in its engagement on the end of the shaft B, to exert a bind to clamp the disks $f$ and the spacing collar $i$ between it and the shoulder $g$, by the headed screw $m$, the shank of which axially penetrates the extremity of the secondary shaft B while the head engages, in a countersunk seat therefor, the end wall of the thimble.

In the example of the device here given two of the cylinders D are shown as integrally formed in opposite relations on the head flange C, the ports or fluid ways $a$ for each communicating into the chamber in the head adjacent the circular line of the edges of the disks $f$. The piston J in each cylinder D has a piston rod or stem-like extension $k$; and levers L duplicated and respectively appurtenant to each piston are,—on pivot studs $m^2$ at the rear face of the head flange,—intermediately fulcrumed. Each lever at its outer end has an engagement with the piston rod by slot $n$ in the lever and stud $o$ carried by the piston rod so that a swinging movement imparted to the lever imparts a reciprocatory movement to the piston in the cylinder against the liquid or fluid therein. The levers carry rollers $s$ at their inner ends adjacent the periphery of the shaft A coacting with which roller provided lever extremities is a collar P slidable on the shaft A and having an inclined or cam constituting circumferentially continuous surface $t$ for impingement against the lever carried rollers $s$ when the collar is slid in the line of the axis of the shaft. A usual form of yoke $u$ carried by a lever $u^2$ engages the grooved slidable collar P; and $u^3$ represents an operating rod for imparting the shifting movement to the collar. A spring 23 is applied in relation to each lever L for retractile action thereon. The cylinder and pistons are principally utilized to keep the fluid chamber $x$, more or less, filled with the fluid, but may also vary the pressure, when desired.

In operation with the collar P shifted to the rightward and the pistons outwardly drawn in the cylinders D no motion will be transmitted from the driving shaft A to the other shaft B, but if the sleeve is moved on the shaft toward the chambered and disk inclosing head the pistons are, in consequence thereof, forced toward the head, forcing a fluid through the ducts $a$ into the clearance spaces between the disks, and the friction of the fluid upon the inner surfaces of the chambered head and the head carrying disk causes it to follow or rotate with these parts. The friction of the rapidly moving fluid upon the disks carried by the secondary shaft induces movement of the latter at a speed which may be varied through an indefinite range according to the quantity of the fluid or liquid displaced by the pistons from the cylinders into the chambered disk accommodating head. The disks may if desired, some or all thereof, have apertures 20 therethrough, as shown in Figs. 5 and 6, for accelerating the distribution of the fluid within the interleaved disk structure.

As shown in Fig. 3, interposed annular packings of paper, rubber, or any suitable compressible material are represented as interposed between the spacing rings 12 and the disks and also between the spacing rings 12 and the head flanges C and G to the end of acquiring an absolutely tight closure at the circumference of the chambered head; and combined with the sleeve F is a stuffing box, as represented at Q in Fig. 1, for preventing any leakage and loss of the liquid centrally from the chamber along the driving shaft. In some of these devices a single cylinder and piston operating connections would suffice, and on the other hand the number thereof may be increased in any extent desired; and the clutch or transmission device may have fewer or a greater number of disks than represented in the drawings here provided, and manifest inversions or reversals of the arrangements of the parts may be carried out without departing from my invention or sacrificing any of the advantages thereof.

I claim:—

1. In a clutch, a casing, a pair of shafts, means carried by each shaft so as to face each other, said first named means being arranged in spaced relation so as to have but a slight space therebetween, and means for supplying fluid in said space to thereby fill the same with a thin film thereof to transmit movement of one shaft to the other by virtue of said interposed thin film of the fluid.

2. In a fluid pressure clutch, a shaft carrying an enlarged hollow head, having secured circumferentially thereto and extending inwardly therewithin, a plate or web, and another shaft axially alined with the first shaft having a portion thereof located concentrically within the chamber in said head and having a plate affixed thereto and extended outwardly within said opening, in fixed permanent separation form, and with a facewise overlapping relation to said head carried plate, and means for supplying fluid into the chamber in said head.

3. In a device of the character described, a rotative hollow head, and a shaft axially alined with said head, having an end portion thereof located concentrically within the chamber in said head, interleaved plates or webs arranged in sets, there being a fixed permanent space between said sets, said sets being respectively secured to the head and extended inwardly from the circumferential portion thereof and secured to, and outwardly extended from, the extremity of said shaft, and means varying the quantity of a fluid within the chamber in the head.

4. In a device of the character described, a rotative hollow head, and a shaft axially alined with said head, having an end portion thereof located concentrically within the chamber in the head, interleaved plates or webs, respectively secured to the head and extended inwardly from the circumferential portion thereof and secured to, and outwardly extended from, the extremity of said shaft, a cylinder carried by said head having communication with the chamber in the head, a piston in the cylinder and means for forcibly moving the piston in the said cylinder for varying the quantity of fluid displaced from the cylinder into the head.

5. In a fluid pressure clutch, a shaft carrying an enlarged hollow head, and another shaft, axially alined with the first shaft, having a portion thereof located concentrically within the chamber in said head and having a plate affixed thereto and extended outwardly within said opening, a cylinder supported on the head, having a way leading therefrom into the said chamber, and having a piston provided with a piston rod, a lever pivotally mounted on the head having a cooperative engagement with the piston rod, and a cam-provided collar slidable on the head carrying shaft and engaging the piston operating lever, and means for sliding said collar.

6. In a device of the character described, in combination, a shaft having a circular head flange and carrying a cylinder having a port leading through said head flange, a sleeve section provided with a circular flange in opposition to the head flange of the shaft, a centrally apertured disk and spacing annular sections which with said disk are marginally confined between the head flange and the sleeve flange, a secondary shaft fitted through said sleeve and having one or more disks attached thereto, at the end portion thereof, arranged in sidewise relation to, and separated from, the aforementioned confined disk, a piston in said cylinder and means for operating the latter.

7. In a device of the character described, in combination, a shaft having a circular head flange and carrying a cylinder having a port leading through said head flange, a sleeve section, provided with a circular flange in opposition to said shaft head flange, a centrally apertured disk, together with annular spacing sections, confined between marginal portions of the head flange and sleeve flange, a secondary shaft fitted through said sleeve, having a shoulder at a distance from its end, a pair of disks in separated relations and non rotatively engaged on the shouldered edge portion of said secondary shaft having a spacing collar between them, and arranged in facewise relations to, and slightly separated from, the said marginally confined disk, a thimble inclosing the end of the secondary shaft and by its open end portion engaging the adjacent one of the shaft carried disks, a headed screw, the shank of which axially penetrates the end portion of the secondary shaft and the head of which engages the end wall of the thimble, a piston in said cylinder, and means for operating such piston.

8. A clutch for transmitting movement of one body to a second body by means of a thin film of fluid interposed between the bodies, composed of two solids arranged to have a space therebetween of such size as to admit but a thin film of fluid which is interposed between said solids, and means for introducing a thin film of fluid in said space between the solids.

Signed by me at Springfield Mass. in presence of two subscribing witnesses.

ROBERT E. NEWCOMB.

Witnesses:
WM. S. BELLOWS,
G. R. DRISCOLL.